United States Patent [19]

Suzuki

[11] 4,260,230
[45] Apr. 7, 1981

[54] CHARGE DEVICE FOR SECONDARY BATTERIES

[75] Inventor: Ryoichi Suzuki, Kawasaki, Japan

[73] Assignee: Canon Kabushiki Kaisha, Tokyo, Japan

[21] Appl. No.: 28,674

[22] Filed: Apr. 10, 1979

[30] Foreign Application Priority Data

Apr. 18, 1978 [JP] Japan .................................. 53/46090
Apr. 18, 1978 [JP] Japan .................................. 53/46091

[51] Int. Cl.³ ........................ G03B 29/00; G03B 7/26; H02J 7/04
[52] U.S. Cl. .................................. 354/76; 354/60 R; 354/234; 354/266; 320/39
[58] Field of Search ................. 354/75, 76, 60 R, 202, 354/234, 235, 271, 266, 295, 354; 320/2, 37, 38, 39, 40

[56] References Cited

U.S. PATENT DOCUMENTS

| 3,215,922 | 11/1965 | Olsen et al. | 320/40 |
| 3,321,691 | 5/1967 | Walsh | 320/40 |
| 4,136,310 | 1/1979 | Foster | 320/37 |
| 4,137,493 | 1/1979 | Smith | 320/39 |

OTHER PUBLICATIONS

"Sanyo Technical Review", vol. 9, No. 2, Aug. 1977.

Primary Examiner—L. T. Hix
Assistant Examiner—William B. Perkey
Attorney, Agent, or Firm—Toren, McGeady and Stanger

[57] ABSTRACT

The present invention relates to a charge device for charging secondary batteries, particularly for a camera to which a system for charging secondary batteries by means of electromagnetic coupling is applied. In the charge system in accordance with the present invention, the shutter curtain control magnet at the side of the camera is used as the secondary coil in such a manner that the above charging system can be applied to the camera by means of a simple construction. The purpose of such construction is to prevent over-charging by automatically stopping the charging when the secondary battery has been charged up to a certain determined level or controlling the charging time by means of a timer.

12 Claims, 15 Drawing Figures

FIG. 2
(a)
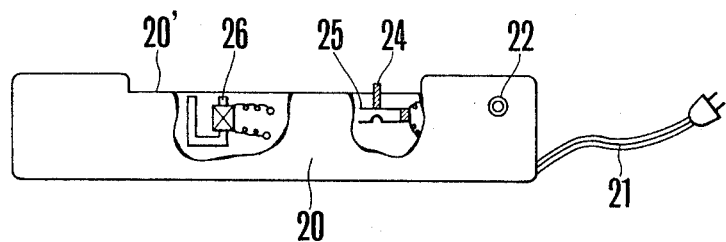
(b)
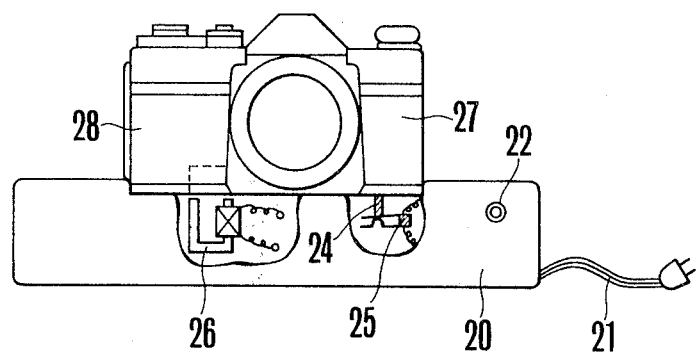

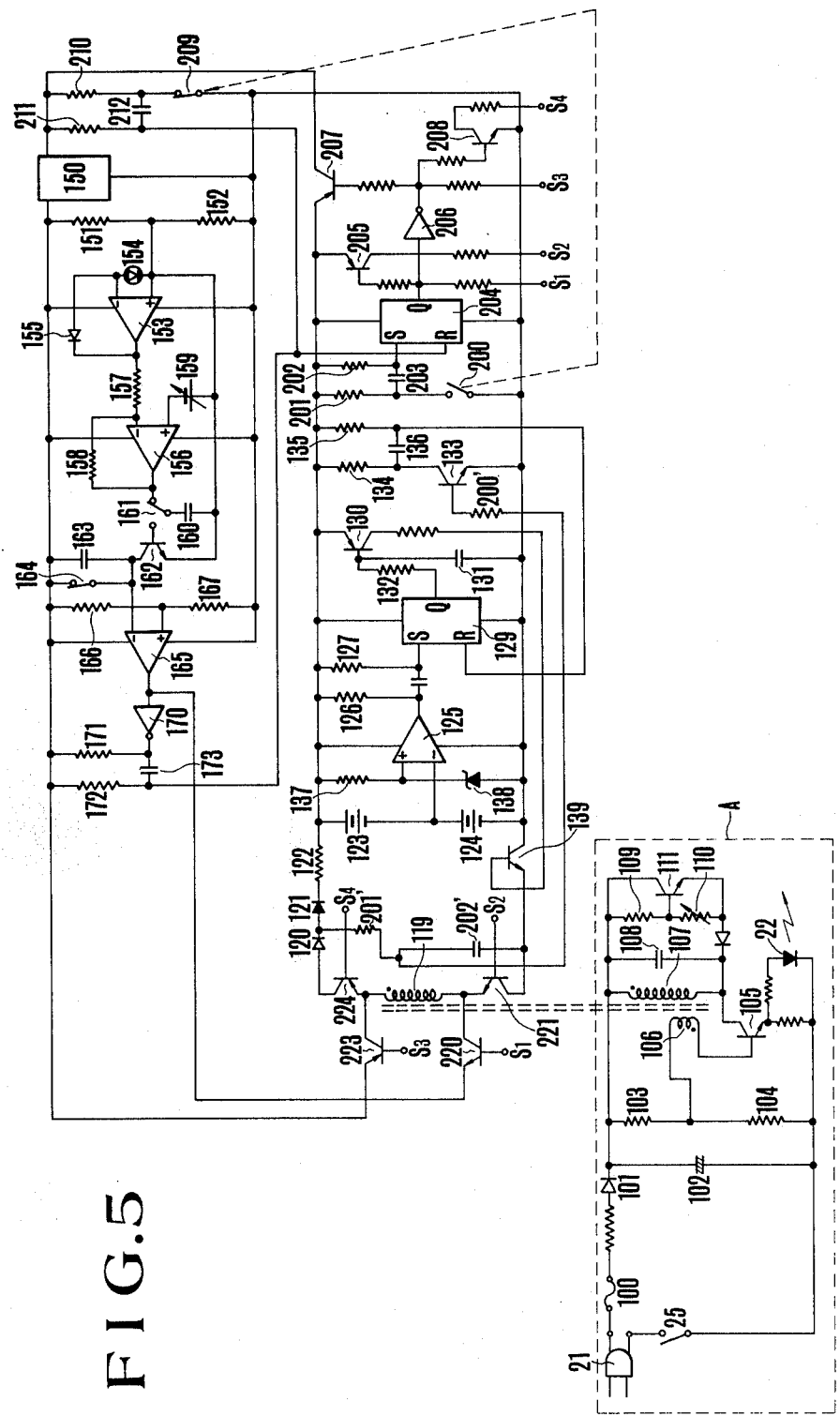
F I G. 5

FIG.13
(a)
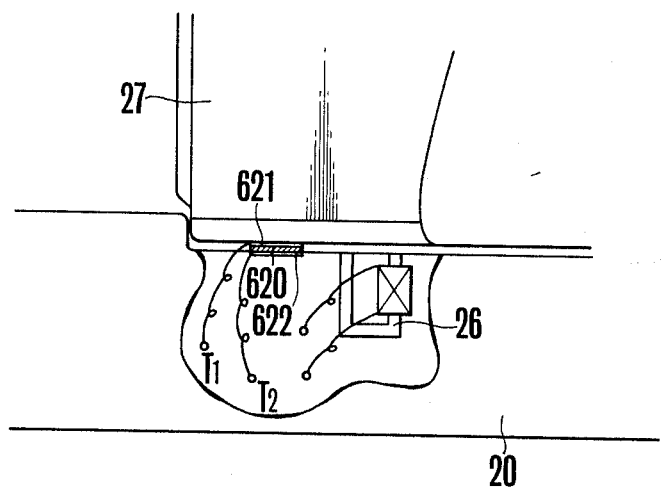
(b)
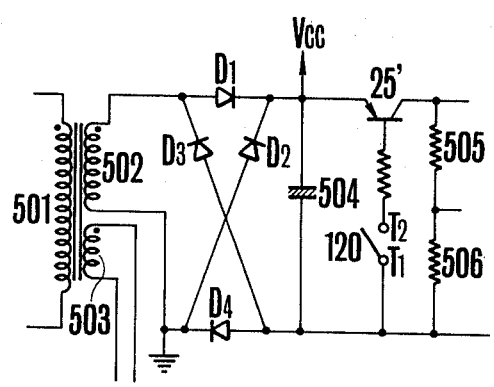

CHARGE DEVICE FOR SECONDARY BATTERIES

BACKGROUND OF THE INVENTION

1. Field of the Invention

The present invention relates to a charge device for a secondary battery built in the camera as the power source for electrical circuits, and particularly for enabling the charging of the built-in secondary battery by electromagnetically connecting the camera body with the charge device.

2. Description of the Prior Art

Until now, primary batteries such as mercury batteries, oxide silver batteries and other batteries with small capacity are mostly used as the power source for the electrical circuit of the camera. Quite recently, there has been a tendency that the power consumption in the electrical circuit built into the camera increases along with the increase of the number of functions of the camera so that the conventional primary battery of small capacity is insufficient. That is, for the handy camera, the built-in power source system has become a major problem.

A power source system has been proposed which is designed so that instead of a primary battery, a small rechargeable secondary battery such as a Ni-Cd battery is built in which is charged by means of a simple method. That is, the serviceable lifetime of the secondary battery is prolonged by normally charging the built-in secondary battery by making use of the photo-electromotive force of solar batteries arranged at proper positions outside of the camera. However, the power source system with the charge system which makes use of the solar battery has the following difficulties:

1. The camera is not always used under sun light conditions. That is, the light incident upon the solar battery is often interrupted or decreased, so that no current flows to charge the secondary battery.

2. In the case, for example, where the built-in secondary battery is 6 V, it is necessary to prepare more than 20 solar battery units. In such case, it is hardly possible to arrange them on the outer surface of the camera.

3. Because the spectrum of luminescent light is different from that of the light required to be incident on the solar battery for producing an electromotive force, no charge is carried out under artificial light. Thus, the power consumption of the secondary battery becomes great when used for a long time under such circumstances.

As mentioned above, the power source system for charging built-in secondary batteries by means of the electromotive force of the solar batteries has many difficulties, and has little practicability as the power source system for a camera.

Aside from the above-mentioned charge system, an electromagnetic coupling system is known for charging a secondary battery built in the apparatus by simply placing the apparatus on the charge device. That is, this system is composed as is shown in FIG. 1, wherein the primary coil 10 and the yoke 11 are arranged at the side of the charge device and are electromagnetically coupled with the secondary coil 15 and the yoke 16 arranged at the side of the apparatus. This is done to induce an A.C. voltage in the secondary coil 15, by means of which voltage the secondary battery 18 is charged. However, this system also has inconveniences, as follows:

1. In the case where the camera body is placed for a long time on the charge device, the secondary battery in the camera continues to be charged. As a result, there is a danger of over-charge and of leakage, breakage, and so on, depending upon the kind of secondary batteries being used.

2. It is necessary to provide a secondary coil in the camera body, so that the manufacturing cost of the camera body becomes high.

SUMMARY OF THE INVENTION

A purpose of the present invention is to provide a charge device of the electromagnetic coupling system which is designed so as to automatically stop the charging of the secondary battery when the secondary battery has reached the fully charged state.

Another purpose of the present invention is to provide a charge device in a remarkably simple construction of the charge device for a camera, by making use of the coil for the exposure control magnet in the camera body at the same time as the secondary coil for charge.

Further, another purpose of the present invention is to provide a charge device free from over-charging by providing a timer circuit in such a manner that the secondary battery for the camera is charged only during the time controlled by means of the timer circuit.

Further, another purpose of the present invention is to provide a charge device for controlling the charging time exactly by making the timer circuit operate only while the charging is actually being carried out.

Further, another purpose of the present invention is to provide a charge system for a camera which is designed so that the coil of the shutter curtain holding magnet of a camera is made use of as the secondary coil for charging in such a manner that the coil is automatically changed over to the shutter control circuit at the time of photographing.

In accordance with the invention, a system for a camera comprises a charge device and a camera. The charge device includes an oscillator for producing A.C. power and an oscillation coil coupled to the oscillator. The oscillation coil acts as a primary coil of a transformer. The camera includes coil means acting as the secondary coil of the transformer for the oscillation coil. A voltage is induced in the coil means when the oscillation coil is electromagnetically coupled with the coil means. Secondary battery means are included which are chargeable with the induced voltage. Further included are prohibiting means detecting the output of the secondary battery means for prohibiting the current supply to the secondary battery means when the output of the secondary battery means reaches a certain determined value and a photographing control circuit in which the secondary battery means acts as a power source. The coil means act as the secondary coil constituting the electromagnetic means for controlling the operation of elements of the camera.

For a better understanding of the present invention, reference is made to the following description and accompanying drawings, while the scope of the present invention will be pointed out in the appended claims.

BRIEF DESCRIPTION OF THE DRAWINGS

In the drawings:

FIGS. 2(a) and 2(b) further illustrate the principle for the charge system shown in FIG. 1 to be applied to a camera;

FIGS. 5 and 6, respectively, show another embodiment of the circuit in accordance with the present invention;

FIG. 13(a) and (b), respectively, show a broken-away pictorial view and a circuit diagram of another embodiment of the switch of the connecting part of the secondary battery charge system of the present invention.

DESCRIPTION OF THE PREFERRED EMBODIMENTS

Figure 1:
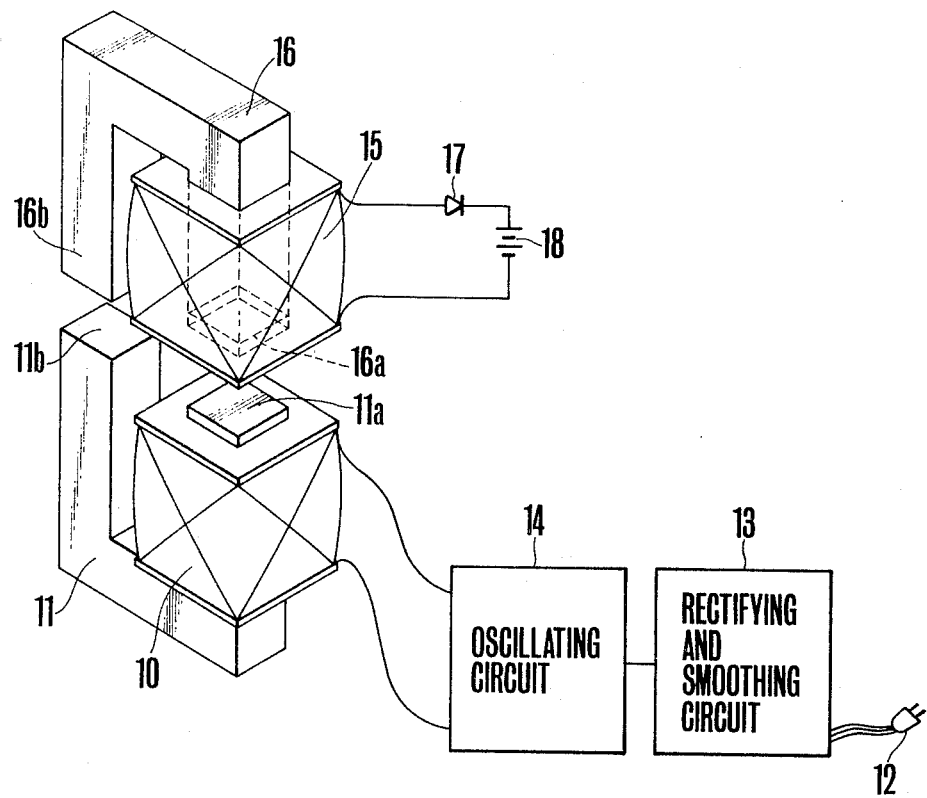
FIG. 1 illustrates the principle for the conventional secondary battery charge system to be applied to the present invention.

Referring initially to FIG. 1, shown there is the principle for the conventional secondary battery charge system to be applied to the present invention. In the drawing, element 10 is the primary coil of a transformer arranged at the side of the charge device, element 11 is a yoke constituting the magnetic path of the transformer, element 12 is a cord and plug for the commercial A.C. source, element 13 is a rectifying and smoothing circuit, and element 14 is an oscillating circuit. The above elements are arranged at the side of the charge device. Element 15 is the secondary coil of the transformer, while element 16 is the yoke at the side of the camera disposed in such a manner that the planes 11a and 11b of the yoke 11 at the side of the charge device face the planes 16a and 16b of the yoke 16 at the side of the camera so as to be electromagnetically coupled to the latter. Element 17 is a non-return diode and element 18 is the secondary battery. The elements 15–18 are built in the camera.

In the drawing, when the power source plug 12 is inserted in the socket of the commercial A.C. line, a D.C. current is produced at the output of the rectifying and smoothing circuit 13. At the output of the oscillating circuit 14, actuated by means of this D.C. current, an A.C. output voltage is produced and applied to the primary coil 10 of the transformer in such a manner that at the ends 11a and 11b of the yoke 11, an alternating magnetic flux corresponding to the above A.C. voltage is produced. This alternating magnetic flux flows through the closed magnetic circuit consisting of the yokes 16 and 11. By means of this magnetic flux, an A.C. voltage corresponding to the alternating magnetic flux is induced in accordance with the law of electromagnetic induction. Only the positive component of the A.C. voltage passes through the diode 17 so as to charge the secondary battery 18.

FIG. 2(a) shows the outline of the construction of the electromagnetically coupled charge device. In the drawing, element 20 is the charge device body; element 20' is the horizontal table on which the camera body is to be put; element 21 is the power source cord and plug; element 22 is the pilot lamp for displaying the charge state; and element 24 is the insulating projection projecting the horizontal table 20'. Element 25 is the power source switch for the rectifying and smoothing circuit 13 and the oscillating circuit 14 built into the charge device body 20. Element 26 is the yoke on which the primary coil is wound.

In the state shown in FIG. 2(a), the projection 24 projects upwards by means of the urging strength of the one contact piece of the switch 25. Accordingly, the switch 25 is in an open state so that the circuits in the charge device body remain in the non-operative state.

When, then, as is shown in FIG. 2(b), the camera body 27 is placed on the horizontal table 20' of the charge device body 20, the projection 24 is pressed down with the proper weight of the camera 27 so as to be moved downwards, whereby the switch 25 is closed. At the same time, the circuits in the charge device body 20 start to operate. In accordance with the law explained in FIG. 1, an alternating flux is thus produced in the yoke 26 and flows through the secondary coil and the yoke 28 in the camera body 27 so that the secondary battery at the side of the camera is charged. The yoke at the side of the charge device constitutes a closed magnetic circuit together with the yoke at the side of the camera. Further, at the same time as the start of charging the secondary battery, the charge display lamp 22 lights up.

Figure 3:
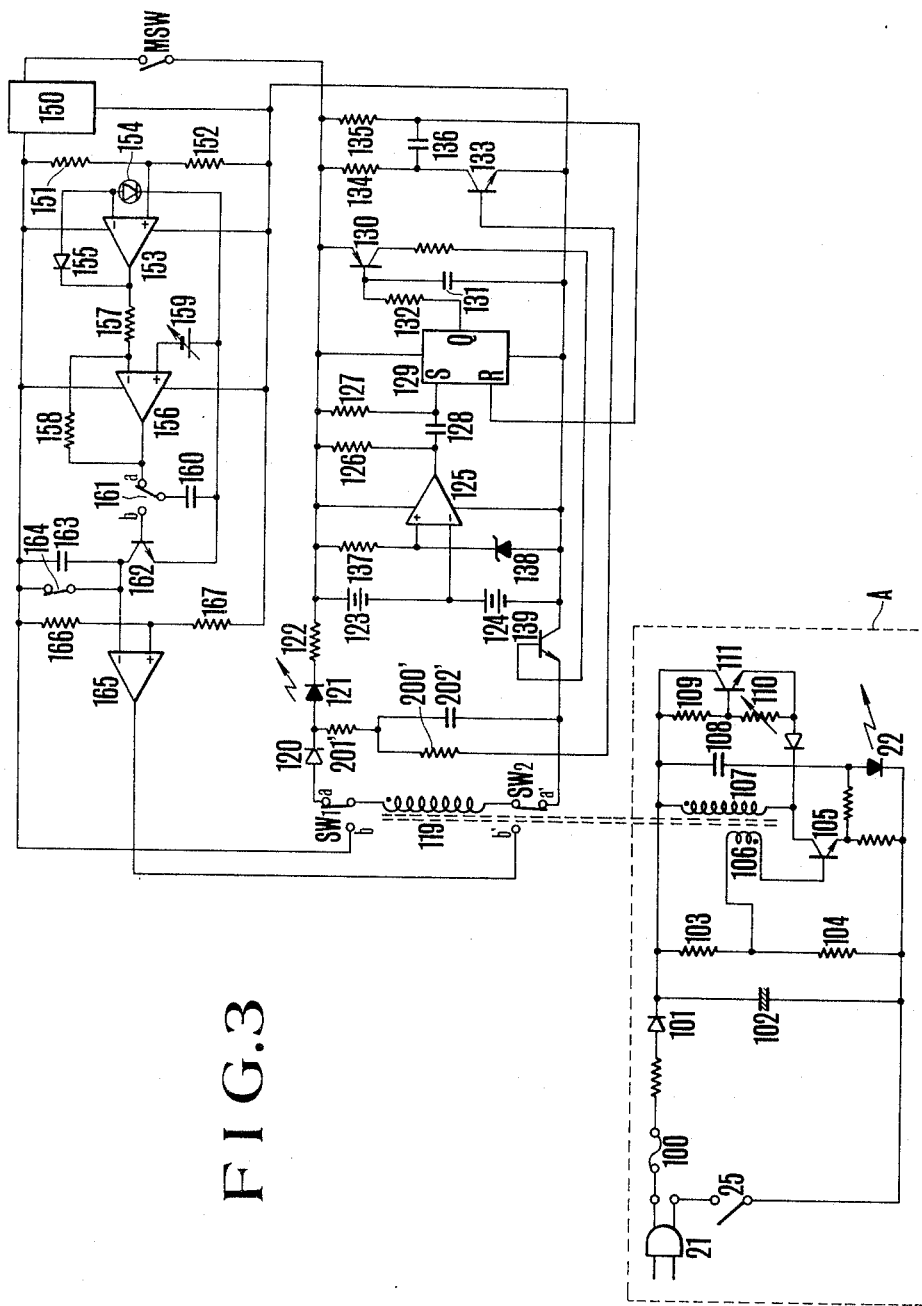
FIG. 3 illustrates a circuit diagram of an embodiment of the secondary battery charge system in accordance with the present invention.

Below, the charge device of the present invention working in accordance with the above-mentioned principle will be explained. FIG. 3 shows the first embodiment of the present invention. This embodiment presents a means for detecting the charge voltage of the secondary battery so that when the charge amount of the secondary battery is increased up to a certain determined level of the charge voltage, the charge of the secondary battery is interrupted. The arrangement is designed so that when the camera body dismounted from the charge device is again put on the charge device, the above charge interruption state is released.

Figure 4:
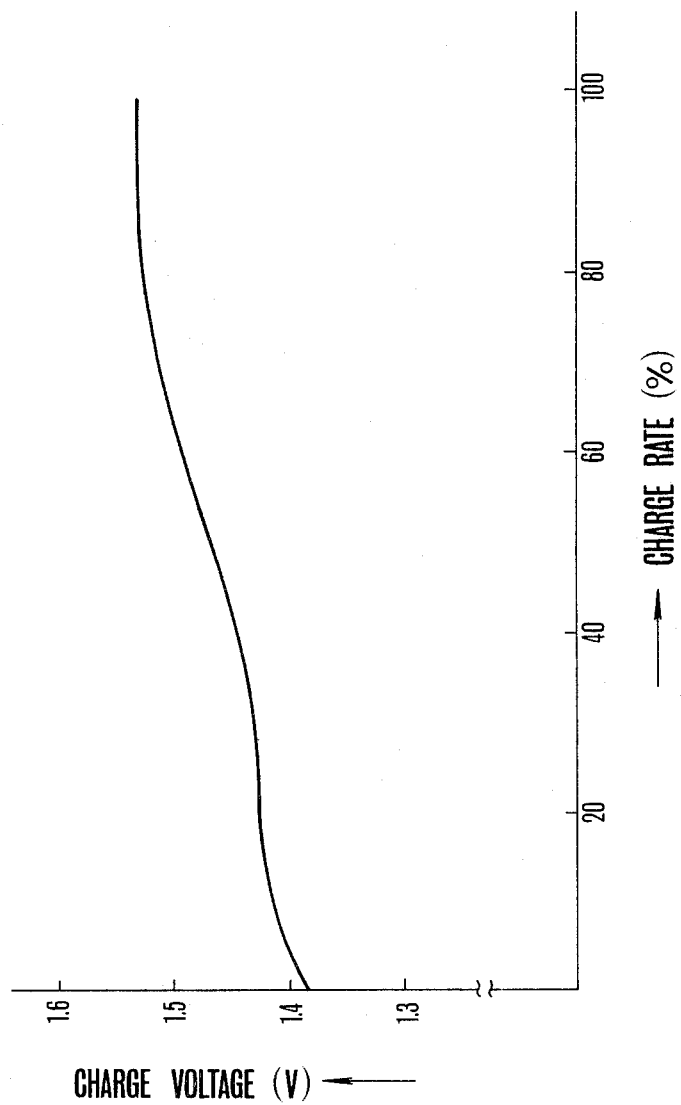
FIG. 4 shows a graphical example of the charge characteristics of the secondary battery.

FIG. 4 shows the general characteristics curve of the charge of the charge voltage of the flat type nickel cadmium battery at room temperature. As is clear from the drawing, along with the increase of the charge amount, the charge voltage goes up to about 1.53 V, when the secondary battery is fully charged. In accordance with the present embodiment, the charge of the secondary battery is interrupted, with the above voltage being detected. It is assumed that the camera is an automatic exposure control single lens reflex camera with priority on aperture. Further, in the case of the present embodiment, the coil of the trailing shutter curtain control magnet is made use of as secondary coil so that it is not necessary to provide a secondary coil separately.

In FIG. 3, block A is the rectifying and smoothing circuit and the oscillating circuit at the side of the charge device. Element 21 is a power source plug, element 25 is a switch and element 100 is a fuse. Element 101 is a half-wave rectifying diode and element 102 is a smoothing condenser. Elements 103 and 104 are voltage dividing resistances, element 105 is a transistor, element 106 is a coil connected to the base of the transistor, element 107 is a primary coil connected to the collector of the transistor 105, and element 108 is a condenser connected in parallel to the coil 107, the above elements constituting a conventional LC oscillating circuit. Elements 109, 110 and 111 are a resistance, variable resistance and transistor constituting an oscillation voltage adjusting circuit. When the collector current of the transistor 111 is adjusted by adjusting the variable resistance 110, the voltage produced between both terminals of the primary coil 107 and the magnetic flux produced with the primary coil 107 are adjusted. Thus, between both terminals of the primary coil 107, a sinusoidal wave whose frequency f is determined by $(1/2\pi\sqrt{LC})$ is produced. The frequency f is chosen comparatively high in order to reduce the size of the coil L and the condenser. L is the self-inductance of the primary coil 107, while C is the capacity of the condenser 108. Element 22 is the charge display lamp, consisting of an LED.

Elements other than block A are the circuits provided inside of the camera body. Element 119 is the secondary coil electromagnetically connected to the primary coil 107, serving at the same time as the coil of the trailing shutter curtain control magnet. $SW_1$ and $SW_2$ are the change-over switches operatively connected to each other, being provided outside of the camera body so as to be operative in such a manner that when they are connected to a and a', the coil 119 serves as a secondary coil for charging. When they are connected to b and b', the coil 119 serves as a coil for the trailing shutter curtain control magnet. Element 120 is a non-return diode, element 121 is a charge display LED, element 122 is a charge current limit resistance and elements 123 and 124 are the secondary batteries. Element 125 is an operational amplifier being composed of a comparison circuit for detecting the voltage between both terminals of the secondary batteries 124. Elements 137 and 138 are a resistance and Zener diode, whereby the connecting point therebetween delivers the non-inverting input level of the above operational amplifier 125. Further, the voltage of the secondary battery 124 is applied to the inverting input terminal. Elements 126, 127 and 128 are the resistances and the condenser for a differentiation circuit and element 129 is the RS flip-flop circuit to be set by means of the negative output of the differentiation circuit. Element 130 is a switching transistor to be controlled by means of the output of the RS flip-flop circuit 129 and elements 131 and 132 are the condenser and the resistance for a delay circuit.

Element 133 is a switching transistor, whose base terminal is connected to diode 120 through the resistances 200' and 201'. Element 202' is a condenser forming a smoothing circuit together with resistance 201'. Elements 134, 135 and 136 are, respectively, resistances and a condenser for constituting a differentiation circuit, by means of whose negative output the RS flip-flop circuit is reset. Element 139 is a charge current control switching transistor to be controlled by means of the collector current of switching transistor 130.

The exposure control circuit for the single lens reflex camera is shown in the upper part of the drawing, whereby MSW is the main switch of the camera, while element 150 is a constant voltage circuit. Elements 151 and 152 are voltage dividing resistances, 153 is a light measurement operational amplifier and element 154 is a light measurement SPC (silicon photo cell) connected between both input terminals of the operational amplifier 153. Element 155 is a logarithmically compressing diode inserted in the negative feedback circuit. The potential at the non-inverting input terminal of the operational amplifier 153 is provided by the voltage dividing point of the voltage dividing resistances 151 and 152.

Element 156 is an operational amplifier constituting an inverting amplifier together with the resistances 157 and 158, while element 159 is a variable voltage generator for producing the preset aperture value information and the ASA sensitivity information signal of the film to be used, the voltage being applied to the non-inverting input terminal of the operational amplifier 156. Element 160 is a memory condenser for storing the output voltage of the operational amplifier 156. Element 161 is a change-over switch to be changed over from a to b at the start of the upward movement of the quick return mirror of the single lens reflex camera. Element 162 is a logarithmically prolonging transistor, element 163 is the timing condenser connected to the collector of the transistor 162, and element 164 is the count start switch to be opened in synchronization with the start of the leading shutter curtain. Element 165 is an operational amplifier for constituting a comparison circuit, while elements 166 and 167 are voltage dividing resistances. The voltage dividing point of resistors 166 and 167 provides the voltage at the non-inverting input terminal of the operational amplifier 165.

Below, the operation of the circuit composed as mentioned above will be explained.

Initially, the operation at the time of charge will be explained. At the time of charge, the operation button outside the camera body is operated to connect the change-over switches $SW_1$ and $SW_2$ to a and a'. When, then, the camera body is placed on the horizontal table 20' of the charge device as is shown in FIG. 2, the main switch 25 of the charge device is closed so as to actuate the rectifying and smoothing circuit and the oscillating circuit A. D.C. voltage is produced between both terminals of the smoothing condenser 102 in such a manner that the transistor 105 is brought into the switched-on state by means of the divided voltage. Then, a resonance phenomenon takes place by means of the primary coil 107 and the condenser 108 and a sinusoidal wave is produced between both terminals of the primary coil 107. At this time, in the coil 106, a counter-electromotive force takes place at every cycle so as to "open" and "close" the transistor 105 and support the resonance phenomenon. By means of the A.C. voltage produced in the primary coil 107, an alternating magnetic flux is produced in the yoke 26 shown in FIG. 2.

By means of this alternating magnetic flux, an A.C. voltage is produced in the secondary coil 119 (serving at the same time as the coil of the trailing shutter curtain control magnet) at the side of the camera. The produced voltage is halfwave rectified through the diode 120 so as to be supplied to a smoothing circuit consisting of the resistance 121' and the condenser 202'. Thus, the switching transistor 133 is brought into the switched-on state by means of the output of the smoothing circuit so that the differentiation circuit, consisting of the resistances 134 and 135 and the condenser 136, produce an output so that, by means of its negative output, the RS flip-flop 129 is reset to produce an output of L level. Thus, the switching transistors 130 and 139 are brought into the closed condition. The secondary batteries 123 and 124 are, thus, charged by means of the positive component of the A.C. voltage produced in the secondary coil 119. While the secondary batteries 123 and 124 have not been fully charged, the inverted input level of the comparison circuit 125 is lower than the non-inverted input level so that the output of the comparison circuit 125 is maintained at H level.

The secondary batteries continue to be charged until they are fully charged. During this time, the charge voltage of the secondary batteries 124 goes up so that the inverted input level of the comparison circuit 125 becomes higher than the non-inverted input level. Thus, the output of the comparison circuit 125 is inverted to L level, while the differentiation circuit consisting of the resistances 126 and 127 and the condenser 128 produces a negative output. By means of this output, the RS flip-flop 129 is set so that its output is inverted into H level. Thus, being delayed by the time constant defined by the resistance 132 and the condenser 131, the switching transistors 130 and 139 are brought into the switched-off state so as to interrupt the charge of the secondary batteries 123 and 124.

In order to release this charge interruption state, it is sufficient to take the camera body away from the charge device and put it again on the charge device. That is, when the camera body is taken away from the charge device, the voltage induced in the coil 119 disappears and the condenser 202' is discharged through the resistance 200' and the base-emitter of the transistor 133 so as to bring the transistor 133 into the switched-off state. When, then, the camera body is put on the charge device, the transistor 133 is again brought into the switched-on state. Accordingly, as mentioned above, the RS flip-flop 129 is reset, while the switching transistor 139 is brought into the switched-on state so that the secondary batteries 123 and 124 resume the chargeable state.

As mentioned above, when the secondary batteries 123 and 124 have been fully charged, the charge of the secondary batteries by means of the secondary coil 119 is automatically interrupted. Consequently, even if the camera remains on the charge device, the secondary battieres are never overcharged.

Below, the operation of the circuit will be explained when the camera is taken away from the charge device for photographing at the termination of the battery charge. At this time, the change-over switches $SW_1$ and $SW_2$ are connected to b and b', respectively. When the main switch MSW is closed, the light measuring circuit and the exposure control circuit start to operate. When the TTL light is incident upon SPC 154, the short-circuit current flows through the logarithmically compressing diode 155, whereby the output level of the light measurement operational amplifier 153 changes in accordance with the logarithm of the light incident upon SPC 154. The output voltage is added to the ASA sensitivity information of the film to be used and the preset aperture value information and is amplified by means of the inverting amplifier 156 in the next step so as to be stored in the memory condenser 160.

At the same time, when the quick return mirror starts to go up by means of the shutter release, the change-over switch 161 is changed over from a to b. In synchronization with the start of the leading shutter curtain, the count start switch 164 is opened so that the timing condenser 160 is charged with the logarithmically prolonged collector current of the voltage stored in the memory condenser 160. The potential at the collector of the logarithmically prolonging transistor 162 lowers gradually, so that, while the voltage level is higher than the voltage at the voltate dividing point of the voltage dividing resistances 166 and 167, the output of the comparison circuit 165 is at L level so that a current runs through the coil 119 so as to maintain the trailing shutter curtain. On the other hand, when the collector voltage of the transistor 162 becomes lower than the voltage at the voltage dividing point of the resistances 166 and 167, the output of the comparison circuit 165 changes to H level so as to interrupt the current supply to the coil 119 so that the trailing shutter curtain starts to run to terminate the exposure operation.

As mentioned above, in accordance with the present invention, the secondary coil for charging also serves as the trailing shutter curtain control magnet so that it is not necessary to provide the secondary coil separately, while when the secondary batteries have been fully charged, the current supply to the batteries is automatically interrupted so that there is no danger for overcharge. Further, in the case of the present embodiment, the secondary coil 119 simultaneously serves as the trailing shutter curtain control magnet by making use of the mechanical switches $SW_1$ and $SW_2$, whereby the photographer has to operate the change-over switches, which may be troublesome. FIG. 5 shows another embodiment of the present invention, where the change-over switching is carried out automatically.

In the case of the present embodiment, the automatic exposure control single lens reflex camera with priority on aperture value is applied in the same way as in the case of the first embodiment, where the secondary coil serves as the trailing shutter curtain control magnet between the shutter button operation and the start of the trailing shutter curtain. The members having the same figures as those in FIG. 3 are the same members. In the drawing, block A is the rectifying and smoothing circuit and the oscillating circuit and is composed in the same way as is shown in FIG. 3. Accordingly, explanation of this circuit is omitted here.

Further, elements 119–139 are the same as those having the corresponding figures in FIG. 3, and explanation concerning these elements is also omitted.

Element 200 is a normally-open switch to be closed with the first stroke of the shutter button and is operatively engaged with the normally-closed switch to be explained later. Elements 201, 202 and 203 are resistances and a condenser of a differentiation circuit; element 205 is a switching transistor connected to the output terminal Q of the RS flip-flop circuit 204; element 206 is an inverting circuit. Elements 207 and 208 are switching transistors connected to the output of the inverting circuit; element 209 is a normally-closed switch operatively engaged with normally open switch 200 so as to be opened with the first stroke of the shutter button; elements 210, 211 and 212 are resistances and a condenser of a differentiation circuit, by means of whose negative differentiating output the RS flip-flop circuit 204 is reset. Elements 150–165 are elements with the same figures as in FIG. 3, constituting the light measurement and the exposure control circuit. Element 170 is an inverting circuit and elements 171, 172 and 173 are resistances and a condenser constituting the differentiating circuit, by means of whose negative output the RS flip-flop 204 is reset.

Elements 220, 221, 223 and 224 are switching transistors respectively connected to the output of the RS flip-flop 204, the collector of the switching transistor 205, the output of the inverting circuit 206 and the collector of the switching transistor 208 through a resistance.

Below, the operation of the circuit composed as described above will be explained in detail.

Initially, the operation during charge will be explained. The rectifying and smoothing circuit A operates, so that by means of the alternating magnetic flux induced there, an A.C. voltage is induced in the secondary coil to charge the condenser 202 forming a smoothing circuit. This is done so that, by means of the output, the switching transistor 133 is "closed" so that a negative output is produced at the lower end of the resistance 135. By means of this output, RS flip-flop 129 is reset so as to deliver an output of L level. Accordingly, switching transistor 130 is brought into the switched-on state so that the switching transistor 139 is also brought into the switched-on state. Further, because the shutter button is not pressed, RS flip-flop 204 is not set, so as to deliver an output of L level. Thus, switching transistor 205 and also switching transistor 221 are brought into the switched-on state, while transistor 220 is brought into the switched-off state. Further, the output of the inverting circuit 206 becomes H level, the switching transistor 207 is brought into the switched-off state, while the switching transistor 208 is brought into the switched-on state. Thus, the switching transistor 224 is also brought into the switched-on state, while 223 is brought into the switched-off state.

In the above-mentioned state, the switching transistors 139, 221 and 224 are brought into the switched-on state, while transistors 220 and 223 are in the switched-off state. Thus, by means of the positive component of A.C. power induced in the secondary coil 119, the secondary batteries 123 and 124 are charged.

Further, when the secondary batteries 123 and 124 have been fully charged, the comparison circuit 125 detects the voltage of the secondary batteries 123 and 124, so as to bring the switching transistor 139 into the switched-off state and interrupt the charge current supply. This operation has been explained in accordance with FIG. 3 and, accordingly, explanation is omitted here.

Below, the operation of the present circuit during the camera operation will be explained in detail. Along with the first stroke of the shutter button, the normally-open switch 200 is closed, and the differentiation circuit consisting of elements 201, 202 and 203 produces an output to set RS flip-flop circuit 204, whose output is H level. Thus, the switching transistor 205 is brought into the switched-off state, so that transistor 221 is brought into the switched-off state and transistor 220 is brought into the switched-on state. Further, the output of the inverting circuit 206 becomes L level, the switching transistor 207 is brought into the switched-on state, transistor 208 is brought into the switched-off state and transistor 223 is brought into the switched-on state.

In the above-mentioned state, the switching transistors 220 and 223 are brought into the switched-on state, while transistors 221 and 224 are brought into the switched-off state so that the charge of the secondary batteries 123 and 124 from the secondary coil 119 is interrupted.

Further, the switching transistor 207 is in the switched-on state, and a current is supplied to the light measurement and the exposure control circuit. The operation of this light measurement and the exposure control circuit has already been explained in accordance with FIG. 3, and further explanation is therefore omitted. In FIG. 5, the switching transistors 220 and 223 are in the switched-on state so that the secondary coil 119 is connected to the output of the comparison circuit 165 to be used as the trailing shutter curtain control magnet.

While the output of the comparison circuit 165 is of L level, a current is supplied to the secondary coil 119 so as to keep the trailing shutter curtain control magnet. After lapse of a certain determined exposure time from the release operation, the output of the comparison circuit 165 is inverted from the L level into the H level in the same way as in the case of the aforementioned embodiment so as to interrupt the current supply to the secondary coil 119. Accordingly, the trailing shutter curtain starts to run to terminate the exposure. At the same time, the output of the inverting circuit 170 is inverted from the H level into the L level, while the differentiation circuit consisting of 171, 172 and 173 produces a negative output, by means of which RS flip-flop circuit 204 is reset. Thus, the output of the flip-flop circuit is inverted into the L level, while the output of the inverting circuit 206 is inverted into the H level. Thus, the switching transistors 205 and 208 are brought into the switched-on state, while transistor 207 is brought into the switched-off state. Further, the switching transistors 221 and 224 are brought into the switched-on state, while transistors 220 and 223 are brought into the switched-off state. Thus, the current supply to the light measurement and the exposure control circuit is interrupted. Further, the secondary coil 119 is changed over for charging, while the shutter button resumes the state before operation.

As mentioned above, in the case of the present invention, the secondary coil 119 is automatically changed over into the trailing shutter curtain control magnet at the time of the camera operation.

Figure 6:
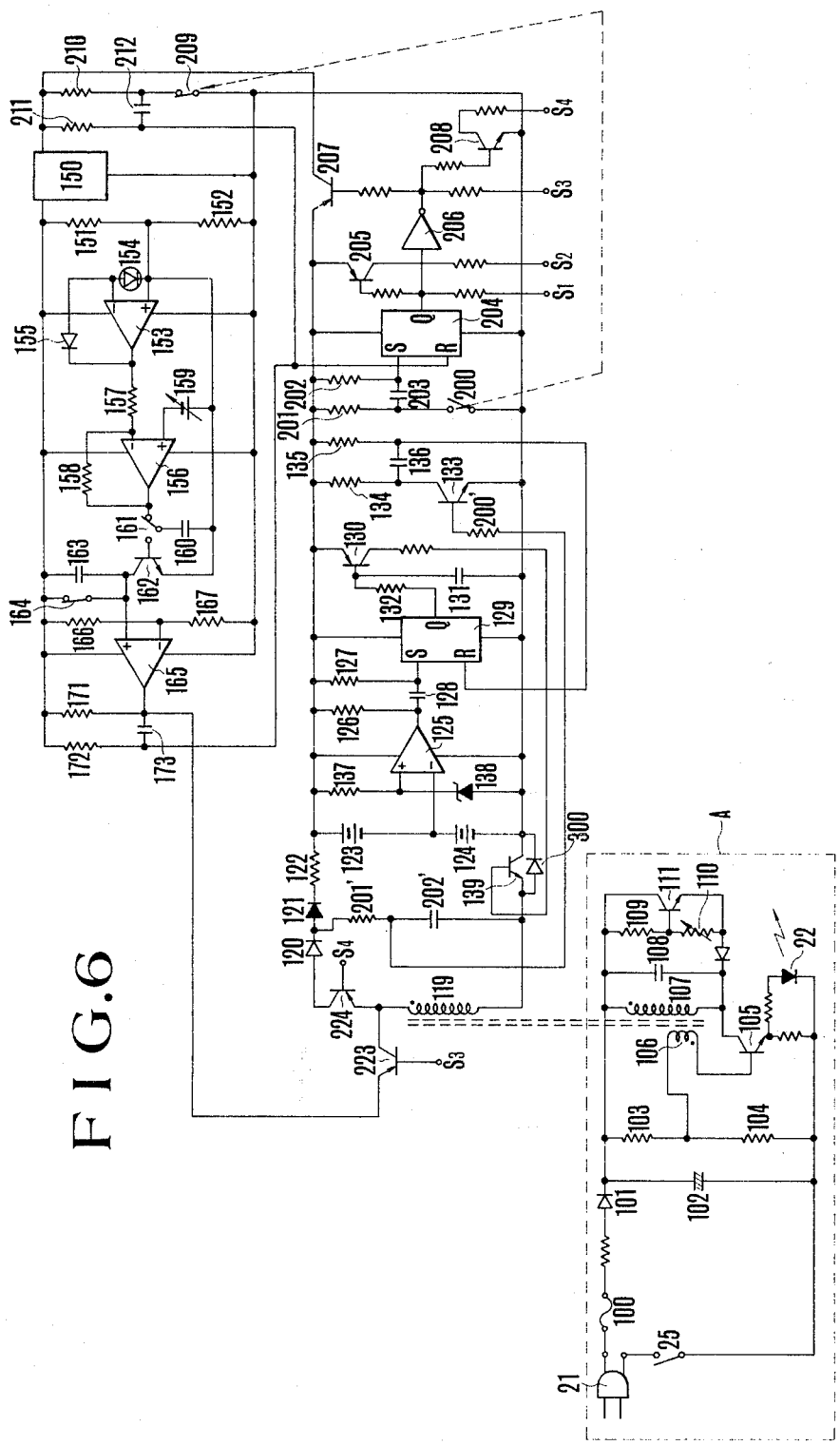

FIG. 6 shows another embodiment of the present invention, whereby another method of the automatic connection change-over between the secondary coil and the trailing shutter curtain control magnet is shown. The difference between the invention shown in FIG. 6 and that shown in FIG. 5 lies in the fact that the circuit shown in FIG. 6 has no switching transistors 220 and 221 and inverting circuit 170, that the polarity of the input of the comparison circuit 165 is inverted and that the diode 300 is connected in parallel with the switching transistor 139 for controlling the charge current. At the time of the charging, the level of RS flip-flop 204 is of L level, while the output of the inverting circuit 206 is of H level so that the switching transistor 208 is in the switched-on state. Thus, the switching transistor 223 is brought into the switched-off state while transistor 224 is brought into the switched-on state. Further, before the secondary batteries 123 and 124 have been fully charged, the switching transistor 139 is in the "closed" state so that the secondary batteries 123 and 124 are charged by means of the A.C. voltage induced in the secondary coil 119.

While the camera is in operation, the output of RS flip-flop 204 is of H level while the output of the inverting circuit 206 is inverted into L level. Thus, the switching transistor 208 is brought into the switched-off state, the switching transistor 224 into the switched-off state and transistor 223 into the switched-on state. Thus, the charge current supply to the secondary batteries is interrupted.

In this case, while the non-inverting input level of the comparison circuit 165 is higher than the inverted input level, the output of the comparison circuit is of H level so that, through the switching transistor 223 and the diode 300, a current is supplied to the secondary coil 119. Thus, in this case the secondary coil 119 serves as the trailing shutter curtain control magnet so as to "keep" the trailing shutter curtain. As mentioned above, also in the circuit of the embodiment shown in FIG. 6, the secondary coil 119 can automatically be changed over for the charging and for the trailing shutter curtain control magnet.

Figure 7:
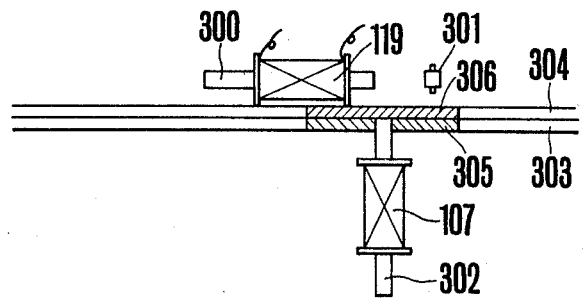
FIG. 7 shows an embodiment of the electromagnetic coupling in the secondary battery charge system in accordance with the present invention.

FIG. 7 shows the arrangement of the primary and the secondary coil of the present invention. The drawing shows the camera body being placed on the charge device, whereby element 300 is the yoke of the trailing shutter curtain control magnet contained in the camera body, element 301 is the armature and element 119 is the secondary coil serving at the same time as the trailing shutter curtain control magnet. Element 302 is the yoke of the primary coil at the side of the charge device, element 107 is the primary coil, element 303 is the metal plate constituting the horizontal table of the charge device, element 304 is the metal plate constituting the camera bottom cover and elements 305 and 306 are the mold plates. The reason why mold plates 305 and 306 are used only for places at which the alternating magnetic flux flows from the yoke 302 into that of yoke 300 is to avoid the loss of energy due to the growth of eddy current resulting from the alternating magnetic flux.

Further, during the shutter winding-up operation, the armature 301 is in close contact with the yoke 300 so as to constitute a closed circuit for the magnetic flux so that the alternating magnetic flux does not flow from the yoke 302 into the yoke 300. Thus, in order to charge the secondary battery of the camera in accordance with this system, it is necessary to put the shutter in the precharged state.

Figure 8:
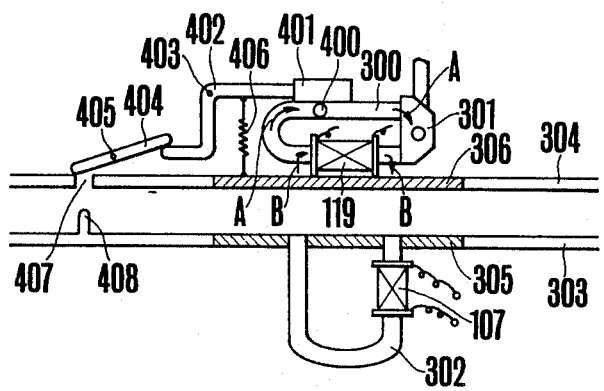
FIGS. 8 and 9, respectively, show another embodiment of the electromagnetic coupling.

FIG. 8 shows an embodiment which is improved regarding the above drawback. In this embodiment, a hole is provided in the yoke of the trailing curtain control magnet so that normally another magnetic permeable member is brought in close contact with the yoke. When the camera body is placed on the charge device of the present invention, the above magnetic permeable member is away from the yoke in order to avoid the formation of the closed loop of the magnetic circuit of the trailing shutter curtain control magnet in the charged state of the shutter.

In the drawing, element 300' is the yoke of the trailing shutter curtain control magnet contained in the camera body, element 301 is the armature, and 119 is the secondary coil serving at the same time as the trailing shutter curtain control magnet. Element 302 is the yoke of the primary coil at the side of the charge device, element 107 is the primary coil, element 303 is the metal plate forming the horizontal table of the charge device, element 304 is the metal plate forming the camera bottom cover and elements 305 and 306 are the mold plates, whose purpose has already been explained in accordance with FIG. 7. Element 400 is the hole provided in the yoke 300, element 401 is the magnetic permeable member in close contact with the yoke having the hole 400, and element 402 is the amagnetic lever secured on the magnetic permeable member, being urged in the clockwise direction around the shaft by means of the strength of the string 406. Element 404 is the lever rotatable around the shaft 405, being in contact with the lever 402. Element 407 is the hole provided in the camera bottom cover, while element 408 is the projection provided on the horizontal table 303 of the charge table. The drawing shows the state in which the shutter has been charged, whereby the armature 301 is in close contact with the yoke 300. Further, the camera is in the state immediately before being placed on the horizontal table 303 of the charge device.

When the secondary coil 119 is used as the coil of the trailing shutter curtain control magnet, in the above state, the magnetic flux induced in the secondary coil 119 flows through the magnetic permeable member 401, because of the magnetic resistance at the part having the hole 400, in order to attract the armature 301.

When, then, the camera body is placed on the horizontal table 303 of the charge device when the secondary coil 119 is used as the charging coil, the projection 408 is inserted into the hole so that the lever 404 is rotated in the clockwise direction so that the lever 402 is rotated in the counterclockwise direction against the strength of the spring 406. Thus, the magnetic permeable member 401 is away from the yoke 400. In this state, the alternating magnetic flux produced in the yoke 302 at the side of the charge device does not flow in the yoke 300 in the direction of the arrow A. The reason is that there is provided a hole 400 and the close contact of the magnetic permeable member 401 and the yoke 300 is released. Thus, the alternating magnetic flux flows through the yoke 300 in the direction of the arrow B, while between both terminals of the secondary coil 119, an A.C. voltage is produced to charge the secondary battery of the camera.

As mentioned above with respect to this embodiment, even when the armature 301 is in close contact with the yoke 300 in the charged state of the shutter, the secondary coil 119 can be used as the charging coil for the secondary batteries.

Figure 9:
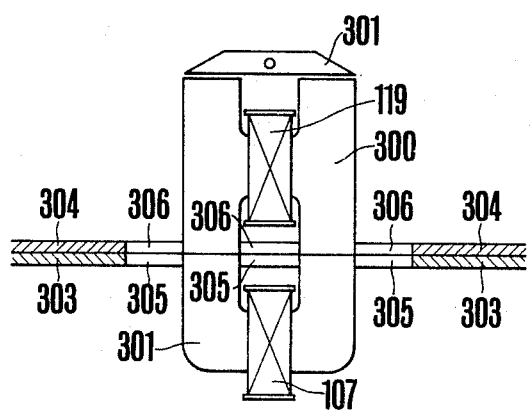

FIG. 9 shows another embodiment of the electromagnetic coupling in accordance with the present invention in the charge system of the secondary battery. In the drawing, members having the same figures as those in FIG. 8 are the same. The drawing shows the state in which the camera body is placed on the charge device. In the drawing, the iron core 300 is provided at the side of the camera body, being composed in the shape of an "H". On the central part of the H shape, a secondary coil 119 is provided, while the upper magnetic path of the shape H is closed by means of the armature 301 of the electromagnetic control mechanism of the camera. Further, the lower magnetic path is in close contact with the upper end of the "U"-shaped core 301 constituting the output part of the magnetic flux of the charge device so as to form a closed magnetic circuit in order to realize the electromagnetic coupling between the charge device and the camera. In accordance with the present invention, the loss taking place at the electromagnetic coupling can be lowered so that a sufficient charge power can be obtained. Thus, the armature 301 at the side of the camera is not shown in the drawing but may be brought out of the magnetic path by means of a proper mechanical means at the time of charging.

Figure 10:
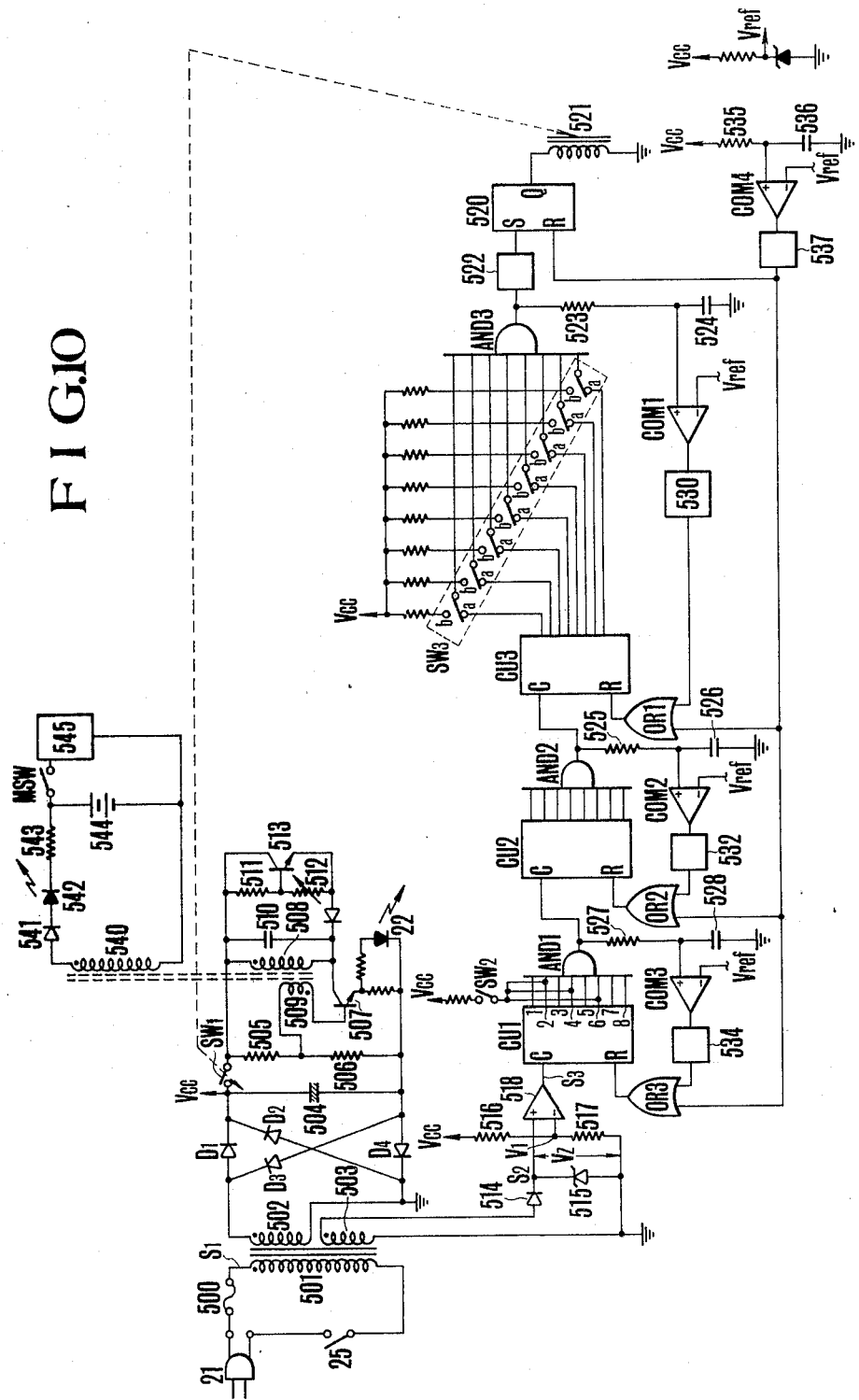
FIG. 10 shows still another embodiment of the circuit in accordance with the present invention.

FIG. 10 shows another embodiment of the circuit of the present invention. In this embodiment, the charge device is provided with a timer designed to automatically start to operate when the camera body is placed on the charge device and stop the operation of the charge device after lapse of a certain determined time. In the embodiment shown in FIG. 10, the counter provided on the charge device counts the commercial frequency (50 Hz or 60 Hz). In the drawing, element 21 is the plug for the power net and 25 is the aforementioned switch to be closed when the camera is placed on the charge device as is mentioned in accordance with FIG. 2. Element 500 is a fuse, element 501 is the primary coil of the power transformer and elements 502 and 503 are the secondary coil. Elements $D_1$-$D_4$ are full-wave rectifying diodes, element 504 is a smoothing condenser and $SW_1$ is the normally-closed relay switch. Elements 505 and 506 are the voltage dividing resistance and element 507 is the switching transistor, whose base terminal is connected to the voltage dividing point of the voltage dividing resistances 505 and 506 through the positive feedback coil 509. Element 508 is the primary coil for charge, while element 510 is the condenser connected parallel to the primary coil 508 to form a resonance circuit together with the primary coil 508. Elements 511 and 512 are a resistance and variable resistance for voltage dividing. The base terminal of transistor 513 is connected to the voltage dividing point. Element 22 is a charge display diode.

Between both terminals of the primary coil 508 for charge, a sinusoidal A.C. voltage is produced by means of the resonance phenomenon between the primary coil 508 and the condenser 510 and the switching effect of the switching transistor 507. The wave height of the A.C. voltage can be changed by adjusting variable resistance 512 so as to alter the collector current of the transistor 513. Element 514 is the half-wave rectifying diode for obtaining the positive component of the A.C. voltage induced in the secondary coil 503, element 515 is the Zener diode for applying a limiter to the half-wave rectified A.C. waveform, element 518 is an operational amplifier for constituting the comparison circuit and elements 516 and 517 are voltage dividing resistances. The divided voltage is applied to the inverter input terminal of the operational amplifier 518. $CU_1$ is an 8 bit counter, $AND_1$ is an AND gate to which all of the 8 bits of the counter $CU_1$ are delivered and $SW_2$ is the on-off switch for applying the power source Vcc to the output terminal of the second bit, the fourth bit and the sixth bit of the counter $CU_1$. The switch $SW_2$ is closed when the commercial frequency 50 Hz is used, while it is opened when the commercial frequency 60 Hz is used.

Counter $CU_2$ is an 8 bit counter for counting the output pulse of the AND gate $AND_1$; and $AND_2$ is an AND gate to which all of the 8 bits of the counter $CU_2$ are delivered; $CU_3$ is an 8 bit counter for counting the output pulses of the AND gate $AND_2$; $SW_3$ is an on-off switch group for adjusting the timing of the timer; $AND_3$ is an AND gate connected to the on-off switch group $SW_3$. Element 522 is a differentiation circuit and element 520 is an RS flip-flop circuit. Element 521 is a coil connected to the output terminal of the flip-flop circuit 520 for constituting a relay switch together with the switch $SW_1$ so that the switch $SW_1$ is opened when a current is applied to the coil 521, while it is closed when no current is supplied. Elements 523 and 524 are a resistor and condenser respectively and are connected to the output of the $AND_3$ and function as a delay circuit; $COM_1$ is a comparison circuit; element 530 is the differentiation circuit; element $OR_1$ is an OR gate whose output is connected to the reset terminal of the counter $CU_3$. Elements 525 and 526 are also a resistor and condenser forming a delay circuit connected to the output of the $AND_2$, and elements 527 and 528 are a resistor and condenser forming a delay circuit connected to the output of $AND_1$. $COM_2$ and $COM_3$ are comparison circuits, elements 532 and 534 are differentiation circuits and $OR_2$ and $OR_3$ are OR gates. The outputs of the OR gates are connected to the reset terminal of the counter $CU_1$ and $CU_2$.

Elements 535 and 536 are a resistor and condenser forming a timing circuit connected to the power source Vcc. $COM_4$ is the comparison circuit. Element 537 is a differentiation circuit, whose output is delivered to the reset terminal of RS flip-flop circuit 520 and to the OR gate $OR_1$-$OR_3$.

Element 540 is the secondary coil for charging contained in the camera body; element 541 is a diode for half-wave rectifying the A.C. voltage induced between both terminals of the secondary coil 540; element 542 is a charge display LED; element 543 is a charge current limit resistor; element 544 is the secondary battery at the side of the camera; MSW is the main switch for the camera and element 545 is the light measurement and the exposure control circuit for the camera. The delay time of the delay circuit (527, 528; 525, 526; 523, 524) is chosen shorter than a frequency of the count pulse to be explained later.

The operation of the embodiment composed as mentioned above will now be explained. When the plug 21 is connected to a commercial power source and the camera is placed on the horizontal table 20' of the charge device 20, switch 25 is closed as is shown in FIG. 2(b). Thus, an A.C. voltage is produced in the secondary coil 502 of the power source transformer, is totally rectified by means of the diodes $D_1$-$D_4$, is smoothed by means of the condenser 504 and is converted into the D.C. voltage Vcc. Thus, by means of the voltage divided by means of the resistances 505 and 506, the transistor 507 is brought into the switched-on state so as to supply a current to the primary coil 508 for charging. The output of the secondary coil 508 is positively fed back to the transistor 507 by means of the feedback coil 509, while the primary coil 508 and the condenser 510 form a resonance circuit. Accordingly, the circuit group assumes an oscillation phenomenon and a sinusoidal A.C. voltage is produced between both terminals of the primary coil 508. When the variable resistance 512 is adjusted, the collector current of the transistor 513 alters so as to alter the load of the primary coil 508 in such a manner that the wave height of the above sinusoidal A.C. voltage is varied. Thus, as will be mentioned later, the charge current for the secondary batteries can be adjusted. When an A.C. voltage in the primary coil for charging is produced, an A.C. voltage is induced also in the secondary coil 540 at the side of the camera. The secondary battery 544 is charged by means of the positive component of the voltage through the diode 541 the LED 542 and the resistance 543. When, at this time, the variable resistance 512 is adjusted as mentioned above, the wave height of the A.C. voltage produced in the primary coil 508 is changed and the wave height of the A.C. voltage induced in the secondary coil 540 at the side of the camera is accordingly changed so as to adjust the charge current for the secondary battery 544.

When the above-mentioned switch 25 is closed and a D.C. voltage Vcc is produced, the timing condenser 536 is charged through the resistance 535 until the charge voltage becomes higher than the standard level Vref of the comparison circuit $COM_4$. The output of the comparison circuit $COM_4$ then becomes H level and a positive differentiated pulse is produced with the differentiation circuit 537. By means of this positive differentiated pulse, RS flip-flop 520 is reset and the output becomes L level so that no current flows through the coil 521. Thus, the switch $SW_1$ remains closed. As mentioned above, an A.C. voltage is produced in the primary coil 508. The positive differentiated pulse produced with the differentiation circuit 537 is supplied to the reset terminal of the counter $CU_1$–$CU_3$ through the OR gates $OR_1$–$OR_3$ so as to reset the output of each bit of the counters $CU_1$–$CU_3$.

Figure 11:
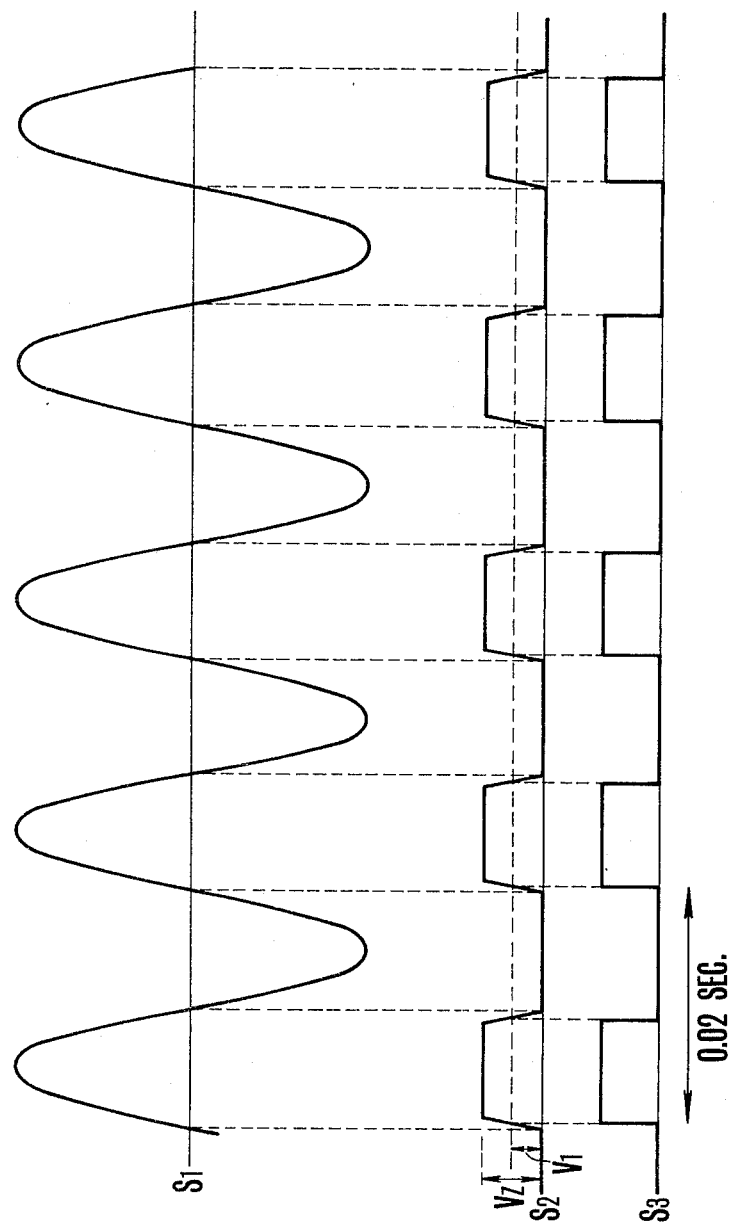
FIG. 11 shows the waveforms of the input signal for the circuit shown in FIG. 10.

The time constant of the above-mentioned timing circuits 535 and 536 is set between the closing of the main switch and the termination of the chattering operation. When the switch 25 is closed, a sinusoidal A.C. voltage is produced between both terminals of the primary coil 501 of the power source transformer, as is shown in $S_1$ in FIG. 11. Thus, also between both terminals of the secondary coil 503, a sinusoidal A.C. voltage is produced, is half-wave rectified by means of the diode 514 and is applied with limiting by means of the Zener diode 515. Accordingly, between both terminals of the Zener diode 515, a waveform as shown in $S_2$ in FIG. 11 is produced. The waveform is compared with the standard level $V_1$ of the comparison circuit 518, and at the output of the comparison circuit 518, a pulse waveform as shown in $S_3$ is produced ($V_1$ is the potential at the voltage dividing point of the resistances 516 and 517). One cycle of the pulse waveform corresponds to 0.02 seconds when the commercial frequency of 50 Hz is used.

The above waveform is counted by means of the counter $CU_1$ in the next step until all the bits of the counter $CU_1$ become logic "1" (hereinafter called H level), when the output of the AND gate $AND_1$ becomes H level. The pulse is supplied to the reset terminal of the counter $CU_1$ though the OR gate $OR_3$ so as to reset each output bit of the counter $CU_1$. Thus, the output of the AND gate $AND_1$ L is inverted into L level. Thus, every time the counter $CU_1$ assumes the full count state, one pulse is produced at the output of the AND gate $AND_1$. The frequency produced by means of this pulse is given by the following relationship when the commercial frequency 60 Hz is employed, because the switch $SW_2$ is then opened:

$$(1/60) \text{ (seconds)} \times [1\times 2^0+1\times 2^1+1\times 2^2+1\times 2^3+ \ldots +1\times 2^7] = 4.25 \text{ (seconds)}$$

Further, in the case of the commercial frequency of 50 Hz, the switch $SW_2$ is closed so that the second bit, the fourth bit and the sixth bit of the counter $CU_1$ always have H level. Thus, the frequency produced is provided by the following relationship:

$$(1/50) \text{ (seconds)} \times [1\times 2^0+0\times 2^1+1\times 2^2+0\times 2^3+1\times 2^4+0\times 2^5+1\times 2^6+1\times 2^7]=4.26 \text{ (seconds)}$$

It is clear that there is practically no difference from the case where the commercial frequency is 60 Hz.

As is clear from the above, the change-over switch $SW_2$ is intended to prevent the deviation of the count number due to the difference of commercial frequency.

Then, the output pulse of the AND gate $AND_1$ is counted by means of the counter $CU_2$ in the next step until all the bits of the counter become H level so that the output of the AND gate $AND_2$ also becomes H level. In the same way as in the case of the counter $CU_1$, the counter $CU_2$ is reset by means of the pulse differentiated by means of the differentiation circuit 532, being delayed a little from the production of the output. That is, every time the counter $CU_2$ assumes the full count state, one pulse is produced at the output of the AND gate $AND_2$. The frequency at which the pulse is produced is nearly given by the following relationship no matter whether the commercial frequency is 50 Hz or 60 Hz:

$$4.25 \text{ (seconds)} \times [1\times 2^0+1\times 2^1+1\times 2^2 \ldots +1\times 2^7]=1083.75 \text{ (seconds)} \div 18 \text{ minutes } 4 \text{ seconds.}$$

The output pulse of the AND gate $AND_2$ is counted with the counter $CU_3$ in the next step. Now, when the entire changeover switch group is connected to a, when each bit of the counter $CU_3$ becomes H level, the output of the AND gate $AND_3$ becomes H level in such a manner that RS flip-flop circuit is set by means of the positive differentiated pulse of the differentiation circuit 522, so that the output becomes H level. Thus, a current is supplied to the coil 521 to open the switch $SW_1$ in such a manner that the primary coil 508 for charging stops oscillating so as to stop the charging of the secondary battery 544 at the side of the camera.

When the output of the AND gate $AND_3$ becomes H level, the differentiation circuit 530 produces a positive differentiated pulse, being delayed a little in time, by means of which pulse the counter $CU_3$ is reset through the OR gate $OR_1$. The time from the start of the counting operation by the counter $CU_1$ until the AND gate $AND_3$ becomes H level is given from the following relationship:

$$1083.75 \text{ (seconds)} \times [1\times 2^0+1\times 2^1+1\times 2^2 \ldots +1\times 2^7]=4605 \text{ minutes } 56 \text{ seconds}=76 \text{ hours } 45 \text{ minutes } 56 \text{ seconds.}$$

Thus, the time of this timer can be set from 0 seconds to 76 hours 45 minutes 56 seconds at intervals of about 18 minutes by changing over each switch of the changeover switch group $SW_3$.

When such a timer circuit as mentioned above is built in the charge device, the charge operation of the secondary battery at the side of the camera is stopped after lapse of a certain determined time so that there is no danger that the secondary battery could be overcharged.

However, even the embodiment shown in FIG. 10 has the following shortcomings. That is, if for some reason during the charging, the camera body is taken away from the charge device and again placed on the charge device later for recharging, the count contents in the counters $CU_1$–$CU_3$ all disappear because the switch 25 is opened when the camera body is taken away from the charge device. That is, the condenser 504 is discharged so that there is no more Vcc. When the camera body is again placed on the charge device for recharging, the D.C. voltage Vcc is produced as mentioned above, and the output of the comparison circuit $COM_4$ becomes of H level, being delayed a little so that a positive differentiated pulse is produced at the output of the differentiation circuit 537 so as to reset all of the counters $CU_1$–$CU_3$. Thus, the counter again starts to count from 0 so that there is a possibility that a much longer time than set at first might be erroneously set.

Figure 12:
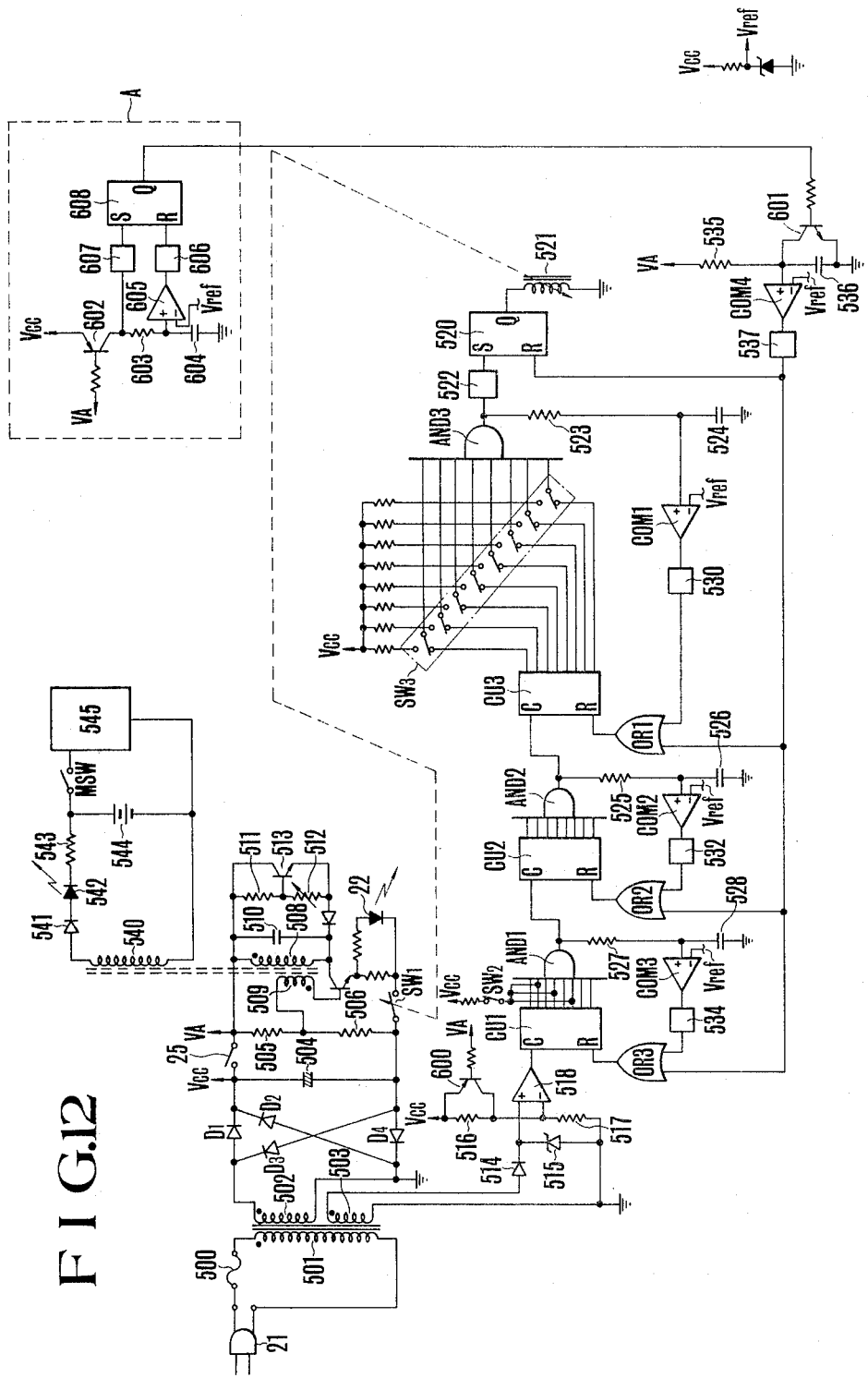
FIG. 12 shows yet another embodiment of the circuit in accordance with the present invention.

FIG. 12 shows still a further embodiment of the present invention, in which the above-mentioned shortcoming is eliminated. In this case, even when the camera is taken away from the charge device, the count operation of the counter is stopped for a certain determined time so as to continue to store the then count content. The elements having the same figures as those in FIG. 10 are the same while the embodiment shown in FIG. 12 is nearly the same as that shown in FIG. 10, so that the explanation for the identical elements is omitted here.

Below, the elements which are different from those shown in FIG. 10 will be explained. In the case of this embodiment, the switch 25 shown in FIG. 2 is arranged after the smoothing condenser 504, while the relay switch $SW_1$ is arranged after the voltage dividing resistor 506. Further, the switching transistor 600 is connected in parallel to the voltage dividing resistance 516 for providing the inverted input level of the comparison circuit 518. The base terminal of the switching transistor 600 is connected to the upper end VA of the voltage dividing resistor 505 through the resistor. The switching transistor 601 is connected in parallel to the condenser 536 forming the reset timing circuit, so that the base terminal is connected to the output of the delay timer circuit A. Further, the timing resistance 535 is connected to the terminal VA. In the delay timer circuit A, element 602 is the switching transistor, whose emitter terminal is connected to the D.C. power source Vcc, while the base terminal is connected to the terminal VA through a resistance. To the collector terminal, the timing resistance 603 and the timing condenser 604 are connected. Element 605 is the comparison circuit, elements 606 and 607 are the differentiation circuit and element 608 is an RS flip-flop, whose output is connected to the base terminal of the switching transistor 601 through a resistance.

Below, the operation of the present circuit composed as mentioned above will be explained in detail.

When the camera body is placed on the charge device the timer starts to operate and when the camera body is taken away from the charge device for some reason, the switch 25 is opened. However, the discharge circuit of the smoothing condenser 504 is opened so that in this embodiment, D.C. voltage Vcc does not disappear. Thus, each circuit continues to operate. Further, when the switch 25 is opened, the output at the VA terminal becomes L level so that the switching transistor 602 in the delay timer circuit A is brought into the switched-on state, so that the collector potential of the transistor 602 becomes H level, while the differentiation circuit 607 produces a positive differentiated pulse so as to set the RS flip-flop circuit 608. The output of the RS flip-flop H level and the switching transistor 601 is brought into the switched-on state. At the same time, the switching transistor 602 is brought into the switched-on state, the timing condenser 604 is charged through the resistance 603 until the charge voltage becomes higher than the standard level of the comparison circuit 605, whose output is inverted into H level in such a manner that the differentiation circuit 606 produces a positive differentiated pulse, by means of which pulse RS flip-flop 608 is reset. Then, the output of RS flip-flop 608 is inverted into L level to bring the switching transistor 601 into the switched-off state. That is, the switching transistor 601 remains in the switched-on state for a certain time determined by the timing circuits 603 and 604 after the camera body is taken away from the charge device. Even when the camera body is placed on the charge device to close the switch 25 and a voltage is produced at the VA terminal while the switching transistor 601 is brought into the switched-on state, the timing condenser 536 is not charged. Thus, the output of the comparison circuit $COM_4$ remains of L level and no differentiated output is produced by the differentiating circuit 537, while counters $CU_1$–$CU_3$ are not reset.

On the other hand, when the camera body is placed on the charge device after the switching transistor 601 is brought into the switched-off state, the switch 25 is closed so that a D.C. voltage is produced between the VA terminals to charge the timing condenser until the charge voltage reaches a certain determined level. The output of the comparison circuit $COM_4$ is thus inverted into H level in such a manner that the differentiating circuit produces a positive differentiated pulse by means of which all of the counters $CU_1$–$CU_3$ are reset.

Further, when the camera body is taken away from the charge device to open the switch 25 and the voltage at the VA terminal becomes L level, the switching transistor 600 connected in parallel with the voltage dividing resistance 516 for giving the standard level of the comparison circuit 518 is brought into the switched-on state. Then, the inverted input level of the comparison circuit 518 is inverted into H level so that the output of the comparison circuit 518 maintains the L level, whereby the pulse output shown in $S_3$ in FIG. 11 stops. Thus, while the camera body is taken away from the charge device, the count operation of the counters $CU_1$–$CU_3$ stops.

As mentioned above, in the case of the present embodiment for a certain determined time after the camera body has been taken away from the charge device, the counter is not reset, keeping the count content before the camera body has been taken away from the charge device. Further, while the camera body is taken away from the charge device, no pulse is delivered to counter $CU_1$ so that the count content of the counters $CU_1$–$CU_3$ makes no advance. Thus, the charge device correctly counts only the timer for charging the secondary batteries at the side of the camera, while even when it becomes necessary to take away the camera body from the charge device for some reason, the counter is not reset within a certain determined time. Thus, the count content makes no progress and any missetting of the count content, taking place every time the camera body is taken away from the charge device, can be avoided. Further, in this embodiment, since the switch 25, a mechanical switch to be closed by means of the proper weight of the camera body, is used, it is clear that other switches of an appropriate type such as a photo coupler switch, an electromagnetic switch, and so on, can be used. For example, FIG. 13 shows an embodiment in which a conductive rubber switch is used.

In FIG. 13a, element 20 is the charge device, element 27 is the camera body, element 26 is the yoke on which the primary coil is arranged, element 620 is the flat conductive rubber element functioning as a switch, elements 621 and 622 are the conductive electrodes provided on the upper and lower surface of 620 and $T_1$ and $T_2$ are the conductors connected to 621 and 622. FIG. 13b shows the circuit diagram, in which instead of the mechanical switch 25, a switching transistor 25' is used, whereby the base terminal is connected to the ground line through the resistance and the conductive rubber 620. In the state in which the camera body 27 is not placed on the charge device 20, the switching transistor 25' remains in the opened state because the resistance value of the conductive rubber is so high that a state equivalent to the opened state of a switch is realized. When the camera body 27 is placed on the charge device 20, the resistance value of the conductive rubber becomes remarkably small due to the proper weight of the camera so that a state equivalent to the closed state of a switch is realized so that the switching transistor 25' is brought into the switched-on state so as to supply a D.C. voltage to the circuits.

As explained so far in detail in accordance with the embodiments for a secondary battery charge system in accordance with the present invention, when the secondary battery has been fully charged, the charge is automatically stopped. Further, the electromagnetically coupled secondary coil serves as the coil for charging the secondary batteries and also as the exposure control electromagnetic mechanism. Thus, manufacturing cost as well as space can be greatly economized.

Moreover, in the embodiment in which the timer circuit is built, there is no danger of over-charge. Further, even when the camera body is taken away from the charge device for some reason and is placed again on the charge device, the timer circuit is not reset within a certain determined time, keeping the clock content, so as to carry out a correct clock operation. This is done in such a manner that the charging time can always be controlled correctly, which is particularly advantageous in practice.

While the foregoing description and drawings represent the preferred embodiments of the present invention, it will be obvious to those skilled in the art that various changes and modifications may be made therein without departing from the true spirit and scope of the present invention.

What is claimed is:
1. A charge system for a camera comprising:
(A) a charge device including:
(a) an oscillation circuit for producing A.C. power; and
(b) an oscillation coil coupled to the oscillation circuit, said coil acting as a primary coil of a transformer;
(B) a camera including:
(a) a secondary power source circuit;
(b) a photographing circuit to be operated by means of the output voltage of the secondary power source circuit as power source, said circuit at least including a coil means for controlling the operation of a camera element;
(c) connecting means for selectively connecting the coil means to the secondary power source circuit or the photographing circuit, said coil means acting as a secondary coil to a transformer for the oscillation coil so as to induce a voltage when the coil means is electromagnetically coupled with the oscillation coil, the secondary power source circuit being charged with the voltage induced in the coil means when the coil means is connected to the secondary power source circuit by means of the connecting means.

2. A charge system for a camera in accordance with claim 1, wherein the camera includes a prohibiting means for interrupting the charge circuit of the voltage induced in the coil means to the secondary power source circuit, the charge circuit being interrupted when the secondary power source circuit has been charged up to a certain determined level.

3. A charge system for a camera in accordance with claim 1, wherein the connecting means connects the coil means to the photographing circuit with the shutter release operation.

4. A charge system in accordance with claim 1, wherein the coil means is one forming the shutter curtain holding magnet.

5. A camera having a secondary power source circuit to be charged by means of the charge device having a first coil means acting as a primary coil of a transformer, comprising:
(a) a photographing control circuit, said circuit including a second coil means for controlling the operation of a camera element so as to induce a voltage when the second coil means is electromagnetically coupled to the first coil means and being operated by means of the power supplied by the secondary power source circuit; and
(b) change-over means for selectively changing over the second coil means to the photographing control circuit or the secondary power source circuit, so that the secondary power source circuit is charged by means of the voltage induced in the second coil means when the second coil means is connected to the secondary power source circuit.

6. A camera in accordance with claim 5, wherein the photographing circuit is a shutter time control circuit of the camera, and wherein the second coil means is a shutter operation control coil.

7. A camera in accordance with claim 5, wherein the change-over means changes over the second coil means from the secondary power source circuit to the photographing control circuit by means of the shutter release operation.

8. A camera in accordance with claim 6, wherein the secondary power source circuit further includes a detecting circuit for detecting the charge voltage of the secondary power source circuit so as to produce an output when the charge voltage has reached a certain determined level and an interrupting means for interrupting the charge circuit of the voltage induced in the second coil to the secondary power source circuit by means of the output of the detecting circuit.

9. A charge system for a camera comprising:
(A) a charge device including:
(a) an oscillation circuit for producing A.C. power; and
(b) an oscillation coil coupled to the oscillation circuit, said coil acting as a primary coil of a transformer;
(B) a camera including:
(a) a secondary power source circuit;
(b) a photographing circuit to be operated by means of the output voltage of the secondary power source circuit as power source, said circuit at least including a coil means for controlling the operation of a camera element;
(c) means for disconnecting said coil means from said photographing circuit and for connecting said coil means to said secondary power source circuit so as to use the coil means as a secondary coil to a transformer for the oscillation coil, said secondary power source circuit being charged with a voltage induced in the coil means when said coil means acts as the secondary coil and induces the voltage.

10. A charge device usable for an apparatus having a secondary power source and a secondary coil means of a transformer so as to charge the secondary power source by means of the voltage induced in the secondary coil means, comprising:
(a) an oscillation circuit for producing A.C. power;

(b) coil means connected to the oscillation circuit so as to act as a primary coil of a transformer for the secondary coil means, the secondary coil means inducing an output when the coil means acting as a primary coil is electromagnetically coupled to said secondary coil means;

(c) switch means having a first position for bringing the oscillation circuit into the operative state when the apparatus having the secondary power source is set on the charge device and a second position for bringing the oscillation circuit into the non-operative state when the apparatus is not set on the charge device;

(d) a first timer circuit, said circuit assuming an initial state at the moment that the switch means assumes the first position from the second position, and starts the clock operation only when the switch means is in the first position, and produces an output after having clocked a certain determined time;

(e) stop means for stopping the operation of the oscillation circuit by means of the output of the timer circuit;

(f) a second timer circuit, said circuit carrying out a clock operation only when the switch means is in the second position and produces an output after having clocked a certain determined time; and (g) signal forming circuit for forming a signal for the period from the start of timing operation to the emittance of output of the second timer circuit, the first timer circuit being prevented from getting into the initial state by the signal from the signal forming circuit.

11. A camera having a secondary power source circuit to be charged by means of a charge device having first coil means acting as a primary coil of a transformer, said camera comprising:

(a) a photographic circuit including coil means for controlling the operation of a camera element, said coil means induces a voltage when the coil means acts as a secondary coil to the transformer; and (b) means for disconnecting the coil means from said photographic circuit and for connecting the coil means to the secondary power source circuit to use the coil means as the secondary coil to the transformer.

12. A camera having a secondary power source circuit, said power source circuit is to be charged by means of a charge device having first coil means acting as a primary coil of a transformer, said camera comprising:

(a) a photographic circuit including coil means for controlling the operation of a camera; and (b) means for rendering said coil means acting as a secondary coil of the transformer in a charge operation.

* * * * *